C. M. STEVENSON.
EYEGLASS MOUNTING.
APPLICATION FILED DEC. 27, 1907.
994,283.
Patented June 6, 1911.
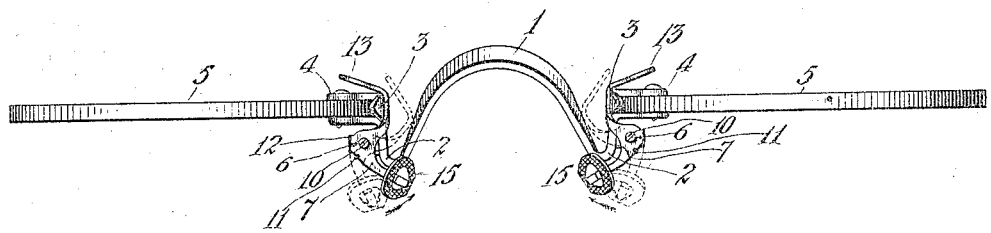
Fig. 1.
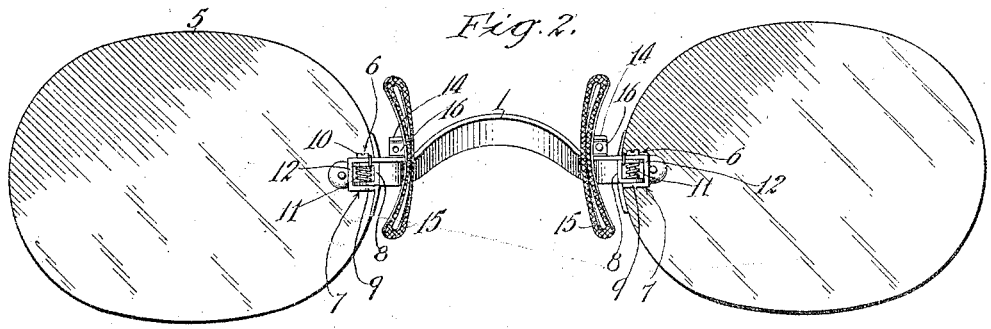
Fig. 2.
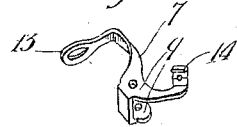
Fig. 3.
Fig. 8.
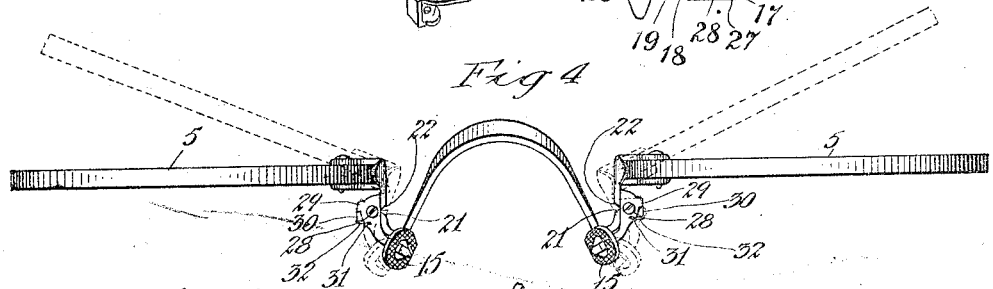
Fig. 4.
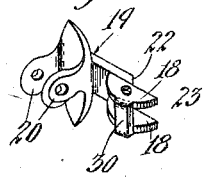
Fig. 5.
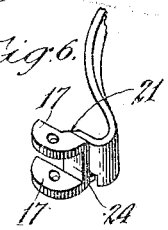
Fig. 6.
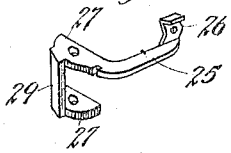
Fig. 7.
Witnesses:
Louis W. Gratz.
Frank Calnahan.
Inventor
Clarence M. Stevenson.
by Townsend Loveskehly
his attys

UNITED STATES PATENT OFFICE.

CLARENCE M. STEVENSON, OF LOS ANGELES, CALIFORNIA.

EYEGLASS-MOUNTING.

994,283.	Specification of Letters Patent.	Patented June 6, 1911.

Application filed December 27, 1907. Serial No. 408,314.

*To all whom it may concern:*

Be it known that I, CLARENCE M. STEVENSON, a citizen of the United States, residing at Los Angeles, in the county of Los Angeles and State of California, have invented a new and useful Eyeglass-Mounting, of which the following is a specification.

With eye glass mountings as constructed at present, in which the guard is pivotally secured to the nose piece, or its accessories, the movements of the guards in placing them in position are substantially in a straight or direct line toward each other, the arc of the movement of each being substantially the same upon both sides of a line drawn through the pivotal point at right angles to the plane of the lens. In other words, lines drawn through the guards and their pivotal points of connection with the bridge piece which is at the inner end of the lens or in line therewith, will be substantially parallel. In fitting mountings of this character to a person having a low bridge of the nose, or one that is very rounding, it has been found that pressure of the guards upon such bridge will have a tendency to push the mounting outward and thereby cause the eyeglasses to fall off. In order to avoid this difficulty, I have discovered that by locating the pivotal or turning point of the guard support at such a point, that a line drawn through the guard and through said support will pass at an angle through the lens, or in other words, the lines drawn through the two guards and their respective pivotal points will converge to a point at the rear and will diverge outward, such construction will cause the guards, when being placed in position upon the nose of the wearer, to move from a position nearer the base of the nose toward the arch of the bridge, and will thereby have a tendency to pull or draw the glasses inward toward the eyes and will also prevent their being so easily shaken off or accidentally removed, even though the nose of the wearer be flat or very rounding. In addition to this, I so construct the different parts of the mounting that they will be very simple and efficient and will permit of the guard automatically adjusting itself to the nose of the wearer as to prevent pain or inconvenience, and at the same time to secure the best possible grippage to hold the glasses in position.

In the accompanying drawings which illustrate the invention:—Figure 1 is a top plan view of a pair of glasses embodying one form of my invention. Fig. 2 a rear elevation of the same. Fig. 3 is a perspective detail view of one of the parts. Fig. 4 is a top plan view of a different form of the invention, and Figs. 5, 6 and 7 are perspective detail views of the same, Fig. 6 being broken. Fig. 8 is a vertical section in the plane of the pivot of the guard.

Referring more particularly to the drawings which are for illustrative purposes and therefore are not drawn to any particular scale, 1 indicates the nose piece which may be of any suitable style, size or shape to adapt it to the facial or other characteristics of the person to whom it is to be applied. Each end of said piece is bent or substantially doubled upon itself, as at 2, and extended forward to form a shank 3. Straps 4, or other suitable means, are provided at the tip or forward end of the shank for securing the lens 5 in position.

Formed upon each shank adjacent to the bend 2 is a pivotal point 6 upon which the guard support 7 is mounted. The pivotal point 6 is preferably formed in ears 8 which project from the shank and preferably extended toward the outer or temporal end of the lens, and the support 7 is preferably formed as a lever with two perforated ears 9 projecting from its edges in position to overlap the ears 8. A pin or screw 10 is adapted to pass through the perforations of said ears and thereby permit of the lever being freely rocked upon the shank. A spring 11 preferably surrounds the pin 10 with its ends engaging with the shank and the lever respectively so as to normally force the rear end of the lever inward and forward as it swings upon said pivot.

The ears 9 of the lever are connected by a strap 12 which overhangs the ears 8, and one end of the lever is preferably extended forward to form a handle or catch 13 by means of which the lever and guard are manipulated in placing the glasses in position.

The inner end of the lever is preferably bent upward to form an abutment or shoulder 14 upon which the guard 15 is pivotally secured. The guard is preferably formed from a contracted loop substantially 8-shaped with an arm or projection 16 extending from the contracted portion and by means of which the guard is secured to the shoulder 14. The guard is preferably secured to the lever so loosely that it may freely rock thereon so as to adapt itself to the configuration or shape of the nose to which it is to be applied.

By forming the parts as above described, they can be formed very cheaply and will possess the requisite amount of strength, as the lever and guard can each be stamped from sheet metal and be easily bent into the desired shape, and the parts can be very quickly assembled or put together.

In using the device the handles 13 are grasped in the usual manner which will force them toward the crest or arch of the bridge piece 1 at that end and will cause the rear ends with the guards 15 to be moved outward, as shown in dotted lines in Fig. 1. The glasses are then placed in position upon the nose and the levers are released by the operator which will permit the springs 11 to swing the inner ends of the levers toward each other and also outward or toward the crest of the bridge piece, as indicated by the arrows in Fig. 1. This movement of the guards will cause them to engage with the nose and have a tendency to draw the lenses inward toward the eyes, owing to the fact that the pivotal points of the levers or guard supports are located so far to the rear of the lenses and in such position relative to their outer or temporal ends as to permit the inner ends of the levers to swing more and more outward the arch of the mounting as the guards move inward to engage with the nose.

Instead of constructing the mountings as above described, each end of the bridge piece may be provided with perforated ears 17 between which are pivotally mounted perforated ears 18 that are secured to or formed upon the shank 19, the opposite end of the shank being provided with straps 20 for securing the lens thereto. The bridge piece is formed with an inclined shoulder 21 against which a similar shoulder 22 upon the shank 19 is adapted to engage when the lenses are swung or bent forwardly in reference to the bridge piece when placing the glasses in position. The ears 18 preferably extend forward in front of the shoulder 22, as shown at 23, so as to engage with the end of the nose piece between ears 17, as shown at 24, for the purpose of holding the lenses in their proper position when the glasses are in repose.

The guard support is in the form of a lever 25 that is provided at its free end with an abutment 26 for the reception of the guard 15, in the same manner as the former construction. The pivotal end of the lever or guard 25 is in the form of perforated ears 27 which are adapted to fit over the ears 17 and be secured thereon by means of a pin 28 that is adapted to pass through the perforations of all of said ears and permit of the desired pivotal movement. The ears 27 are joined together by a strap 29 which fits over the other ears of the mounting and is adapted to be engaged by a strap 30 on the ears 18 when the lenses are moved forward for the purpose of opening the guards or separating them to permit of the glasses being placed in position. Two springs 31 and 32 are arranged around the pin 28, one end of each spring engaging with one end of the main portion of the bridge piece and the other ends of said springs engaging with the shank and the lever, respectively, for holding them in their operative position.

As the pivot in the ears 18 is located to the rear of the lens and in relation to the outer or temporal ends of the lenses as heretofore described for the first construction, it is evident that the guards at the free ends of the levers 25 will move toward the arch of the bridge piece when the levers move toward each other in the same manner as heretofore described, and thereby the glasses of the latter construction will be held in position as securely as those of the first construction.

Having described my invention I claim:—

1. In an eye glass mounting, a bridge piece having its ends, each doubled upon itself and provided with lens clips, perforated ears projecting outwardly from each end of the bridge piece adjacent to said doubled portion, a lever pivotally secured to said ears, and a guard on the rear end of said lever.

2. In an eye glass mounting, a bridge piece having each end doubled upon itself and provided with lens clips, outwardly extending perforated ears adjacent to said doubled portion, a lever having its intermediate portion provided with perforated ears and folded to fit over the ears on the bridge piece, a pin through said perforations, a spring on said pin having its ends in engagement with said lever and bridge piece, respectively, and a guard on the rear end of said lever.

3. In an eye glass mounting, a bridge piece having its ends, each doubled upon itself and provided with a pivot between the place of the lens and said doubled portion, a lever pivotally mounted at each pivot, the rear end of which is bent upwardly and perforated, and a guard loosely pivoted on said upturned portion.

4. In an eye glass mounting, a bridge piece having its ends, each doubled upon itself and provided with a pivot adjacent to said doubled portion, a lever pivotally mounted on said pivot, the rear end of which is upturned, perforated and provided with a shoulder, and an 8-shaped guard provided with a perforated projection at its contracted portion loosely pivoted on said upturned portion and adapted to engage said shoulder.

5. The combination of a bridge for eyeglasses having clips for the attachment oflenses and having posts fixed to said bridge at points directly behind said clips when viewed from the front face of said glasses, nose guards pivoted on said posts, and springs surrounding said posts for impelling said nose guards together, whereby said springs and posts are concealed by said clips when viewed from said front face of the glasses.

6. In a pair of eyeglasses, a bridge having terminal portions turned or bent sharply forward in generally parallel directions, clips at the extremities of said terminal portions for the attachment of lenses, vertical posts on said terminal portions directly behind said clips when viewed from the front of the glasses, nose guards hinged to said posts, and spring means for impelling said nose guards together.

7. The combination, with a bridge, and lens holders, of swinging guards pivoted behind said lens holders.

8. The combination, with a rigid bridge, and lens holders, of swinging guards pivoted behind said lens holders, and within the peripheries of the lenses when secured to said holders.

9. The combination, with a rigid bridge, and lens holders rigidly connected thereto, of swinging guards pivoted behind said lens holders.

10. The combination, with a rigid bridge, and lens holders rigidly connected thereto, of swinging guards pivoted behind said lens holders, and within the peripheries of the lenses when secured to said holders.

11. The combination, with a rigid bridge, and lens holders, of pivot lugs near the ends of said bridge extending behind said lens holders, pivot posts arranged between said lugs, and swinging guards mounted on said posts.

12. The combination, with a rigid bridge, and lens holders, of pivot lugs near the ends of said bridge, extending behind and substantially parallel to said lens holders, pivot posts arranged between said lugs, and swinging guards mounted on said posts.

13. The combination, with a rigid bridge, and lens holders, of pivot lugs near the ends of said bridge extending behind said lens holders, and within the peripheries of the lenses when secured to said holders, pivot posts arranged between said lugs, and swinging guards mounted on said posts.

14. In an eyeglass mounting an S-shaped finger lever, a fulcrum bearing located adjacent to one of the curves of said lever and projecting outward from said lever, combined with a complemental fulcrum journal located back of the lens, a nose guard connected to the terminal of said lever and a spring located at the fulcrum journal and arranged to actuate said lever, substantially as described.

In testimony whereof, I have hereunto set my hand at Los Angeles, California, this 21st day of December 1907.

CLARENCE M. STEVENSON.

In presence of—
W. S. BOYD,
FRANK L. A. GRAHAM.